(12) United States Patent
Farsedakis

(10) Patent No.: US 8,966,650 B2
(45) Date of Patent: Feb. 24, 2015

(54) PORTABLE IDENTITY RATING

(71) Applicant: Lewis Farsedakis, Boca Raton, FL (US)

(72) Inventor: Lewis Farsedakis, Boca Raton, FL (US)

( * ) Notice: Subject to any disclaimer, the term of this patent is extended or adjusted under 35 U.S.C. 154(b) by 184 days.

(21) Appl. No.: 13/854,990

(22) Filed: Apr. 2, 2013

(65) Prior Publication Data

US 2013/0219475 A1    Aug. 22, 2013

Related U.S. Application Data

(62) Division of application No. 12/962,969, filed on Dec. 8, 2010.

(51) Int. Cl.
| | |
|---|---|
| *G06F 7/04* | (2006.01) |
| *G06F 17/30* | (2006.01) |
| *H04N 7/16* | (2011.01) |
| *G06Q 99/00* | (2006.01) |
| *H04L 29/06* | (2006.01) |
| *G06F 21/31* | (2013.01) |
| *G06F 21/33* | (2013.01) |

(52) U.S. Cl.
CPC .............. *H04L 63/08* (2013.01); *H04L 63/102* (2013.01); *G06F 21/31* (2013.01); *G06F 21/33* (2013.01); *G06F 2221/2119* (2013.01)
USPC .......... 726/27; 726/2; 726/3; 726/26; 726/30; 705/325

(58) Field of Classification Search
CPC .................. G06F 21/6245; G06F 21/6272
USPC .............. 726/2–4, 26–30; 705/325, 705, 781, 705/782, 783, 784, 785; 707/705, 781, 782, 707/783, 784, 785
See application file for complete search history.

(56) References Cited

U.S. PATENT DOCUMENTS

| | | |
|---|---|---|
| 5,657,389 A | 8/1997 | Houvener |
| 5,719,560 A | 2/1998 | Watkins |
| 5,771,291 A | 6/1998 | Newton et al. |
| 5,872,848 A | 2/1999 | Romney et al. |
| 6,035,402 A | 3/2000 | Vaeth et al. |
| 6,104,815 A | 8/2000 | Alcorn |
| 6,466,917 B1 | 10/2002 | Goyal et al. ................ 705/18 |
| 6,714,944 B1 | 3/2004 | Shapiro et al. |
| 6,822,954 B2 | 11/2004 | McConnell et al. .......... 370/352 |
| 6,853,973 B2 | 2/2005 | Matthews et al. |
| 7,269,737 B2 | 9/2007 | Robinson |
| 7,367,049 B1 | 4/2008 | Robinson et al. |
| 7,499,875 B1 | 3/2009 | May et al. ................... 705/26.3 |
| 7,516,483 B2 | 4/2009 | Brennan |
| 7,590,859 B2 | 9/2009 | Brennan |
| 7,836,485 B2 | 11/2010 | Robinson et al. |
| 8,250,097 B2 | 8/2012 | Rhodes .................... 707/783 |
| 2002/0015403 A1 | 2/2002 | McConnell et al. .......... 370/352 |
| 2002/0016831 A1 | 2/2002 | Peled et al. |
| 2002/0083008 A1 | 6/2002 | Smith et al. .................. 705/64 |
| 2003/0084331 A1 | 5/2003 | Dixon et al. |

(Continued)

OTHER PUBLICATIONS

"Statement of Use, for Honesty Online, filed in Trademark Ser. No. 78/656,690 on Aug. 29, 2008", Aug. 29, 2012.

*Primary Examiner* — Tae Kim
(74) *Attorney, Agent, or Firm* — Whitman Curtis Christofferson & Cook, PC

(57) ABSTRACT

Portable on-line identity verification technology includes, for example, portable widgets with an identity rating, and other on-line identification verification icons and identity rating scores.

4 Claims, 2 Drawing Sheets

(56) References Cited

U.S. PATENT DOCUMENTS

| | | | |
|---|---|---|---|
| 2005/0027672 A1 | 2/2005 | Arndt et al. | |
| 2005/0066290 A1 | 3/2005 | Chebolu et al. | 715/808 |
| 2005/0216364 A1 | 9/2005 | Jurisic et al. | |
| 2006/0005263 A1 | 1/2006 | Hardt | |
| 2006/0015935 A1 | 1/2006 | Dixon | |
| 2006/0161435 A1 | 7/2006 | Atef et al. | |
| 2006/0248021 A1 | 11/2006 | Jain et al. | |
| 2007/0094264 A1 | 4/2007 | Nair | 707/9 |
| 2007/0112775 A1 | 5/2007 | Ackerman | |
| 2007/0143860 A1 | 6/2007 | Hardt | 726/28 |
| 2007/0288464 A1 | 12/2007 | Silver | |
| 2007/0288755 A1 | 12/2007 | Bryant | |
| 2008/0082381 A1 | 4/2008 | Muller et al. | 705/7 |
| 2008/0120717 A1 | 5/2008 | Shakkarwar | |
| 2008/0207220 A1* | 8/2008 | Aaron | 455/456.1 |
| 2008/0209514 A1 | 8/2008 | L'Heureux et al. | 726/3 |
| 2008/0215346 A1 | 9/2008 | O'Cinneide et al. | |
| 2009/0119299 A1 | 5/2009 | Rhodes | |
| 2009/0177597 A1 | 7/2009 | Dube et al. | |
| 2009/0187417 A1 | 7/2009 | Lidestri | |
| 2009/0210315 A1 | 8/2009 | Jean et al. | |
| 2009/0287937 A1 | 11/2009 | Burden | |
| 2009/0313138 A1 | 12/2009 | Ratnakar | |
| 2009/0327057 A1 | 12/2009 | Redlich | 705/14.2 |
| 2010/0020952 A1 | 1/2010 | Leung | |
| 2010/0122347 A1* | 5/2010 | Nadler | 726/26 |
| 2010/0153278 A1 | 6/2010 | Farsedakis | |
| 2010/0205448 A1 | 8/2010 | Tarhan et al. | |
| 2010/0235623 A1 | 9/2010 | Simpson | |
| 2010/0274815 A1 | 10/2010 | Vanasco | |
| 2011/0078550 A1 | 3/2011 | Nabutovsky | 715/206 |

* cited by examiner

US 8,966,650 B2

PORTABLE IDENTITY RATING

FIELD OF THE INVENTION

This invention relates to the Internet, more particularly to identity verification on-line.

BACKGROUND OF THE INVENTION

There has for some years been known a problem of how one party online (such as one eBay user or one user of a dating website) can be assured that a counterparty on-line actually is who the counterparty describes himself as being.

In eBay's U.S. Pat. No. 6,466,917 issued Oct. 15, 2002 by Goyal et al., for "Method and apparatus for verifying the identity of a participant within an on-line auction environment", there is described a certain identity verification process and identity verified icon. Although the eBay.com website describes the availability of an identity verification process, what is offered thereon does not appear to have been widely taken up by eBay users.

SUMMARY OF THE INVENTION

The present inventor has invented on-line portability of on-line identity ratings and identity verification icons that have been generated by identity assurance technology.

The invention in one preferred embodiment provides an on-line identity rating or identity verification icon customized to an on-line user having a claimed identity, having portability, the identity rating or identity verification icon being clickable by a counterparty to connect to an automated verification system to a record about the user, if and only if appearing on a website page that the user entered into the automated verification system as being authorized.

In another preferred embodiment the invention provides a widget comprising an identity verification score and/or an identity verification icon that relates to an identity claimed by an on-line user, the widget being accessible to the user for the user to insert onto a website page that is not within a website that created the widget.

The invention also in another preferred embodiment provides an on-line identity assurer customized to an on-line user who has a claimed identity underpinning the assurer, wherein the assurer is subject to copying by the user for presentation on a website page, where the assurer is used by a counterparty to access a first message that is generated by a computerized identity verification system and relates to the claimed identity of the user.

BRIEF DESCRIPTION OF THE DRAWING

The invention may be appreciated with reference to the attached figure, without the invention being limited thereto.

DETAILED DESCRIPTION OF A PREFERRED EMBODIMENT OF THE INVENTION

For an on-line identity rating or identity verification icon customized to an on-line user having a claimed identity, portability now has been invented.

An example of an on-line user (such as, e.g., a user name that is connected up with an underlying email address which is not necessarily displayed on a website on which the user name is displayed) having a claimed identity is a claimed identity that has been entered by the user into a website that is part of a computerized system that issues an on-line rating or identity verification icon. Examples of parts of a claimed identity are, e.g., a name (such as a name comprising a first name, a middle name, and a last name), a mailing address, a date of birth, a social security number, etc.

In practicing the invention, a preferred example of an on-line user's claimed identity is an on-line user's claimed identity that has been verified to be an actual identity of exactly one living human, the actual identity having been so verified by other than the human himself or herself.

Examples of an on-line identity rating are, e.g., a numerical identity rating score (within 0-100) as shown on Buyerverse.com within the IDRating logo; a numerical identity rating score as described in U.S. patent application Ser. No. 12/486,398 which is U.S. patent publication no. 20100153278 published Jun. 17, 2010, by Lewis Farsedakis; etc.

Examples of an identity verification icon are, e.g., an identity verification icon as described on eBay.com; an identity verification icon as described in U.S. Pat. No. 6,466,917 (eBay); etc.

Examples of places to where a portable on-line identity or identity verification icon is placed by a user whose identity is verified thereby are, e.g., YouTube; eBay.com; a dating website; Buyerverse.com; etc.

Example 1

Figure 1:
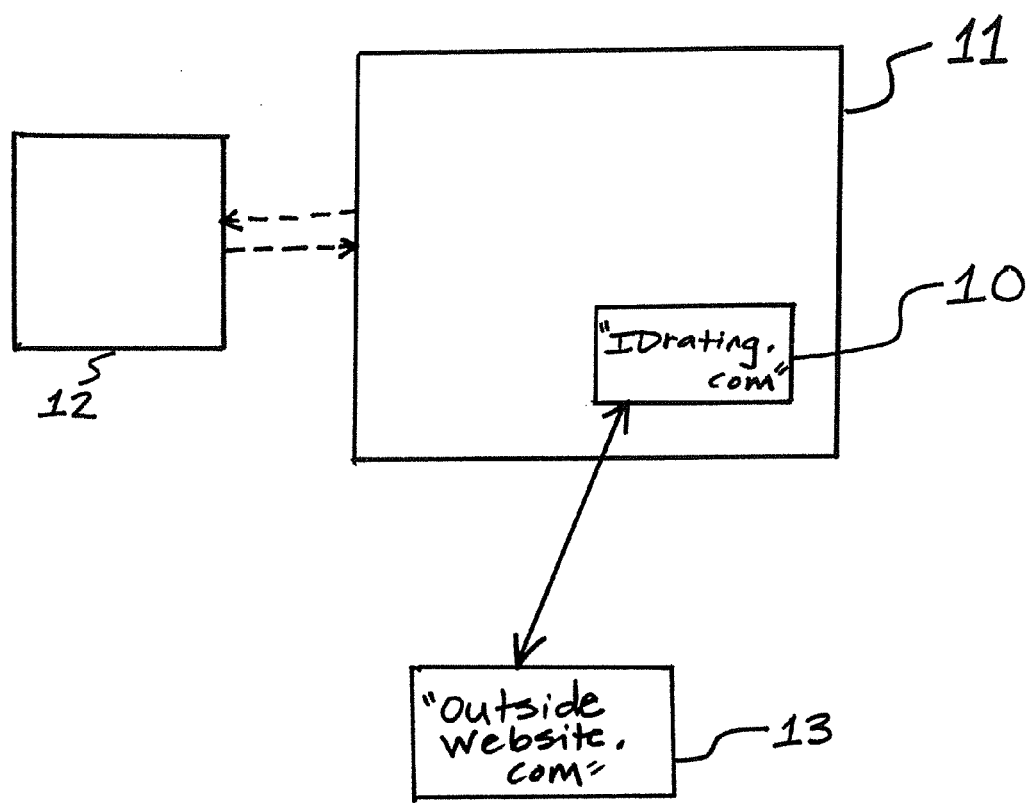
FIG. 1 is a diagram of an inventive embodiment in which "IDrating.com" and "OutsideWebsite.com" are used by way of example, the invention not being limited to use of so named websites.

In this inventive example, an ID Rating website 10 (FIG. 1) is established which provides the public with a method of obtaining online identity verification services for a fee. The website 10, which is part of an automated system 11, provides the user a series of questionnaires and tests to fill out, which are synced with third party identification verification services 12 that return results to the system 11 in the form of a graded score which the system 11 uses to construct a dynamic widget badge/link that can be exported by the user and integrated by the user into websites, social networks, etc. such as website 13 with the expectation that a counterparty (whom the user wants to be assured of the user's identity) will click on the badge. Assuming that the user previously has performed the registration step required of him for registering his usage of the badge on an outside website, when the counterparty clicks the badge, the clicking of the badge loads the profile of the user who owns the badge, verifying that he is truly who he claims he is online.

In this example, one user's badge cannot be used successfully by a hijacker because unless the user who is the owner of the badge has entered into his account in system 11 the exact page on which the badge is to be recognized, any clicking via a badge from other than an entry in a user-specific table of authorized website pages maintained in the system 11 will not result in the website 10 providing the clicker with a profile for the user and optionally system 11 may send a "REJECT" message in a case of an attempted click-through via a badge code and an outside website page that does not appear in a table of registrations by the user for that badge code.

In this example, an identity verification website 10 is constructed which the user visits to begin the sign up process. The identity verification website 10 provides to the user, for the user to fill out, a basic registration form, after which the automated system 11 creates an account for the user who then may proceed with exploring the verification packages. The user is presented, by the website 10, with the different levels of verification services and pricing.

When the automated system 11 receives from the user the user's choice of one or more verification services, the automated system 11 provides the user with questionnaires and tests based on services chosen by the user.

When the automated system 11 receives from the user completed questionnaires and tests, the automated system 11 performs a scoring evaluation for the user, after which the automated system presents the user with a scoring page. The scoring page displays the score of each service and the user's new total ID Rating score.

The automated system 11 compares the user's new total ID Rating score to a required value for issuing a score badge, and if the user's new total ID Rating score meets or exceeds the required value for issuing a score badge, the automated system 11 presents a "generate my score badge" message whereby the user can obtain his badge HTML code from the identity verification website 10.

The automated system 11 generates badge codes for users according to a rule of generating a unique code for each user.

A user who has access to his score badge, which is a unique badge code unique to that user, can paste his unique badge code in one or more various sites or communities online.

Once the user's unique score badge is pasted somewhere on line such as on an outside website 13, anyone clicking the badge will be directed to the user's public profile on the ID Rating website. What, if anything, is seen by the party so clicking depends on whether the user has registered the outside website page 13 into his ID Rating account as an authorized page with the system 11.

The user who is the owner of the ID Rating profile may set privacy options on what information to display to the clicking party who is clicking on the outside page 13. For example, the user may set his public profile to enable or disable certain fields from appearing to a clicking party based on the user's preferences.

The ID rating badge is provided by the automated system 11 to the user in the form of a code snippet, which is unique to each user. When the user registers an outside website 13 in the user's account with the ID Rating website 10 and places his badge code on the outside website 13, the badge when clicked-through by a clicker on that outside website 13 is subject to successful authentication by the ID Rating website 10. The user-specific table of registrations (of outside websites 13 where the user has placed his badge) in the ID Rating website 10 ensures that if the badge is somehow being used on an unauthorized website by an unauthorized user, the unauthorized user cannot get the benefit of the authentication from the system 11 (and correspondingly the clicker will be suspicious due to not having received an immediate authentication from system 11). When the click-through is in order by virtue of the user-specific table of registrations for the user including the website page from where the click-through is arriving, system 11 performs a successful authentication back to the clicker clicking on the badge in real-time in normal operating conditions.

When the ID rating badge is in use on an outside website 13 registered by the user in his account with the ID Rating website 10, the score on the badge reflects the ID score that the ID rating website 10 shows as current, because the score is being dynamically generated in real time from the ID rating website 10. Relatedly, when a user updates his score on the ID Rating website 10 (such as by having completed an additional verification level), his score will update immediately on all the websites 13 and locations where his badge is being displayed for which he registered his displays in his account in system 11.

Example 2

Figure 2:
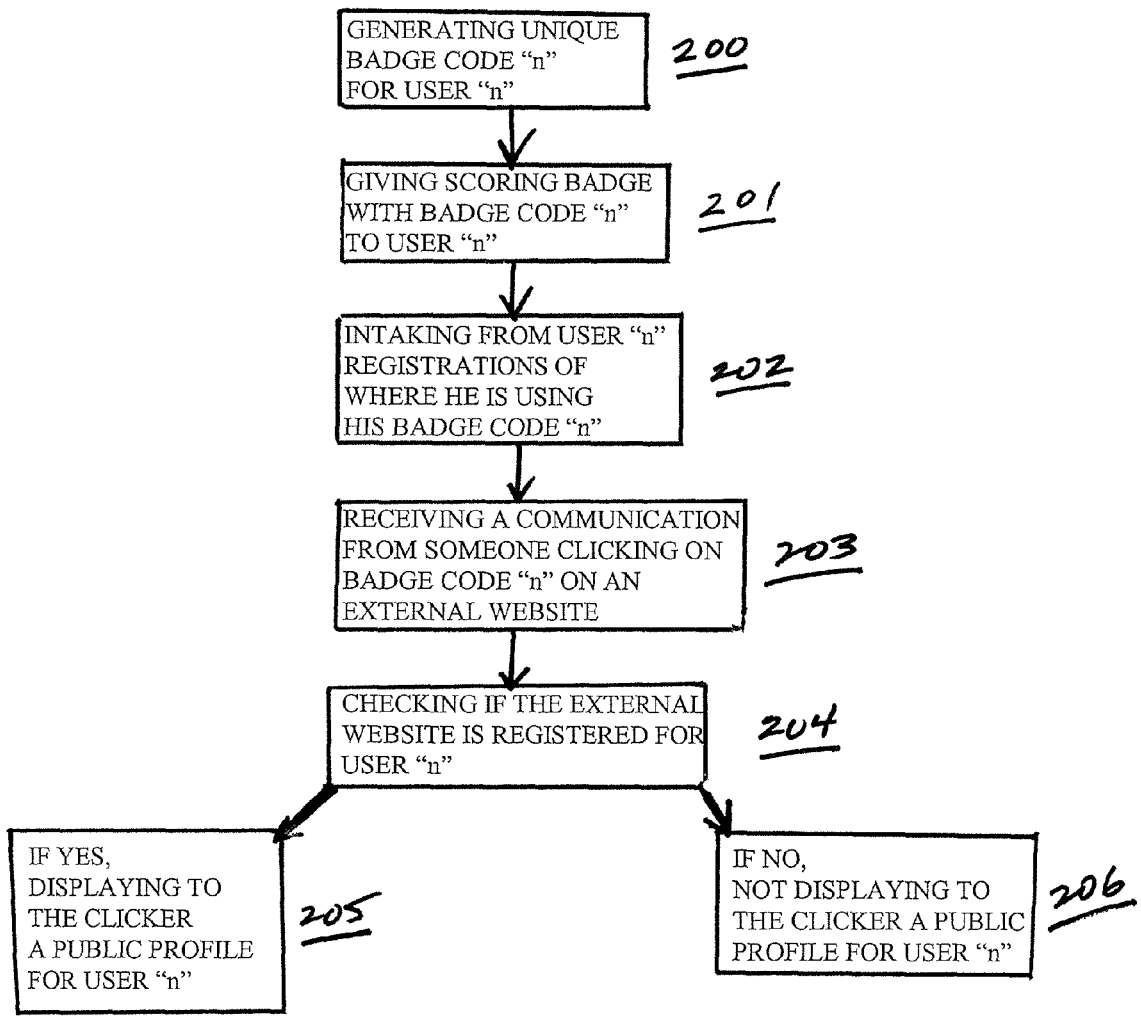
FIG. 2 is a flow chart of an inventive process performed by a computerized system (such as system 11 in FIG. 1).

In this example, as shown in FIG. 2, process steps are performed by a computerized system, such as system 11, which performs steps as follows, of: generating 200 a unique badge code "n" for user "n" (such as, e.g., the user in Example 1 who undergoes identity verification); giving 201 a scoring badge with the unique badge code to user "n"; intaking 202 from user "n" registrations of where he is using his badge code; receiving 203 a communication, as a result of someone having clicked on badge code "n" on an external website (such as website 13 in FIG. 1); and checking 204 if the external website is registered for user "n" before displaying to the clicker a public profile for user "n".

If the checking step 204 results in a YES determination that the external website is registered for the user "n" in the user-specific table of registrations maintained by the website 10, then the automated system 11 performs a step 205 of displaying to the clicker a public profile for user "n".

If the checking step 204 results in a NO determination that the external website 13 is NOT registered for the user "n", then the automated system 11 follows a rule of not displaying 206 to the clicker a public profile for user "n".

Example 2A

In a case where the automated system 11 receives a click-through via a badge and ascertains that a registration is lacking in the user-specific table for the user whose code is in the clicked-through badge, preferably the system 11 performs a follow-up investigatory step.

It should be appreciated that variations and modifications from the embodiments set forth above may be made without departing from the spirit of the invention, and that such modifications are to be considered within the present invention.

What I claim is:

1. An on-line identity verification method in which computer-performed steps are performed by a computerized verification system said steps comprising:
   providing, performed by a website that is part of the system, to a user a series of questionnaires and tests to fill out, followed by:
   generating, performed by the system, a unique badge code for the user;
   giving, by the system to the user, a scoring badge with the badge code which is a unique badge code unique to user, wherein the unique badge code is pasteable by the user in one or more various sites or communities online;
   intaking by the system from the user a set of registrations of where the user is using the badge code;
   receiving by the system a communication from a clicker who is someone clicking on the badge code on an external website, wherein in case of a hijacked icon being clicked on, after the receiving step, the verification system performs a step of sending a "reject" message to the clicker and does not provide a public profile of the user to the clicker;
   checking by the system if the external website is registered for user in the set of registrations; and
   if YES, displaying to the clicker the public profile for user; but
   if NO, not displaying to the clicker the public profile for user.

2. The method of claim 1, further comprising, wherein when the verification system receives an attempted click-through on the badge code from a website page that does not appear in the table of registrations by the user, a step performed by the verification system of sending a "reject" message.

3. The method of claim 1, further comprising displaying an on-line identity rating for the user.

4. The method of claim 1, further comprising displaying an identification verification icon for the user.

* * * * *